Patented Nov. 24, 1936

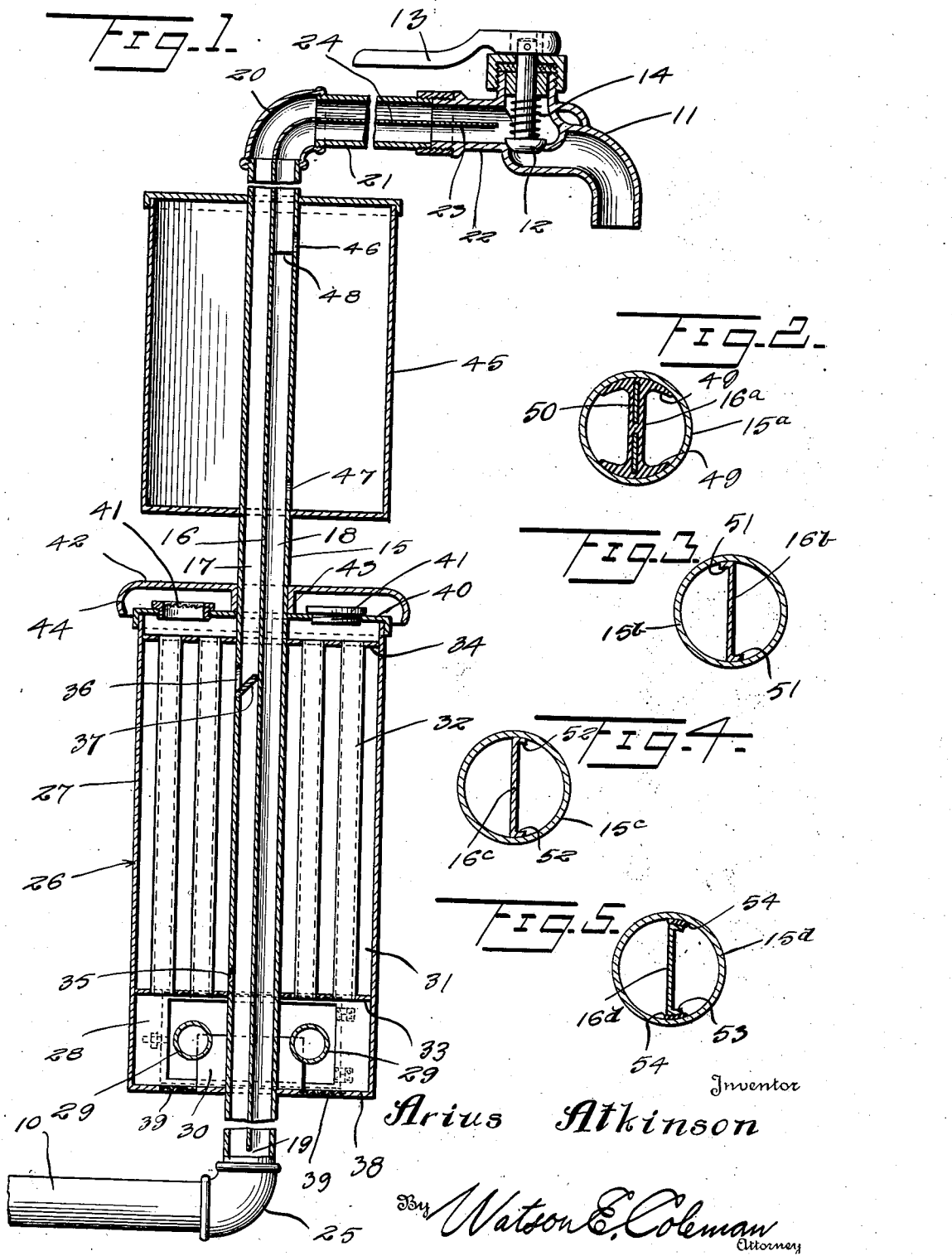

2,062,246

UNITED STATES PATENT OFFICE 2,062,246

ANTIFREEZING DEVICE

Arius Atkinson, Stillwater, Okla., assignor of one-fourth to James E. Berry, Stillwater, Okla.

Application April 28, 1936, Serial No. 76,818

5 Claims. (Cl. 138—32)

This invention relates to water systems and more particularly to a means for preventing freezing of water in a pipe system.

An object of this invention is to provide an improved means which may be attached to a water system to provide a circulation of water within a pipe so that the same will not freeze in pipe or hose.

Another object of this invention is to provide an improved circulating means for a water pipe or hose which is automatically cut off when water is withdrawn from the usual tappets or faucets and which is automatically set in operation as soon as the tappets or faucets are shut off.

A further object of this invention is to provide in combination with a partitioned pipe or hose, a heating means associated therewith, whereby an active circulation of water is maintained on each side of the partition when the faucets or outlets connected to the pipe are shut off so as to thereby prevent freezing of the water or other liquid disposed within the pipe or hose.

The above and various other objects and advantages of this invention will in part be described in, and in part be understood from the following detail description of the present preferred embodiment, the same being illustrated in the accompanying drawing, wherein:—

Figure 1 is a vertical section partly in detail and partly broken away of an improved antifreezing means for a water system.

Figure 2 is a transverse section of one form of partition used with a conventional pipe.

Figure 3 is a modified form of the partition mounted in a pipe.

Figure 4 is a further embodiment of a partition mounted within a pipe.

Figure 5 is a further modification of a dividing wall disposed within a hose or pipe.

Referring to the drawing wherein like symbols designate corresponding parts throughout the several views, the numeral 10 designates generally a pipe which is adapted to be connected at one end to a source of water supply and which has connected thereto a faucet 11 having a handle 13. This faucet 11 is here shown as being one of a type where the handle 13 is rocked relative to the housing of the faucet and the valve 12 carried by the faucet 11 is held in seated position by means of a spring 14. It will be understood, however, that other types of faucets or outlet valves may be associated with the hereinafter described anti-freezing means which is interposed between the pipe 10 and the faucet 11.

In order to provide a means whereby the water emanating from the source of supply to which the pipe 10 is connected will not freeze, I have provided a pipe 15 which may be of a suitable length and which has mounted therein a partition 16 which divides the interior of the pipe 15 into a hot water chamber 17 and a second or circulating chamber 18. This partition 16 terminates adjacent one end of the pipe 15, as shown at 19, and continues through an L or connector 20 into a branch 21. The housing of the faucet 11, having a nipple 22, may also be provided with a partition 23 alining with the partition 24 carried by the branch 21 so that the hot water chamber 17 will be continuous from the connection 25, connecting the supply pipe 10 with the pipe 15 to the faucet 11.

The water from the supply pipe 10 is adapted to freely flow on opposite sides of the partition or dividing wall 16 when the valve 11 is in open position. A heating member, generally designated as 26, is disposed about the pipe 15 at a suitable point and the heating member 26 comprises a housing 27 having a combustion chamber 28 at one end thereof in which burners 29 are mounted and the burners 29 may be lighted through the medium of a lighting member 30 of conventional construction. The casing 27 has a heating chamber 31 therein, through which heater tubes 32 extend, the heater tubes 32 being connected at one end to a wall 33 above the combustion chamber 28 and an upper wall 34 disposed adjacent the top of the casing 27. Water from the chamber 17 of the pipe 15 is adapted to enter the heating chamber 31 through an inlet opening 35 provided in the pipe 15 adjacent the lower wall 33 and the sides of this opening 35 are inclined upwardly and inwardly with respect to the chamber 17 so that when the valve 11 is in open position, the water in the chamber 17 will not be shunted into the heating chamber or reservoir 31. The pipe 15 is provided with an outlet opening 36 adjacent the upper end of the heating chamber 31 and a check valve 37 is carried by the pipe 15 and is gravitatingly maintained in open position when the pressure on opposite sides of the partition 16 is equal and the valve 11 is closed.

The casing 27 is provided in the lower wall 38 thereof with screened openings 39 and is provided with an upper flanged plate 40 in which screened or filtering plugs 41 are mounted so that the gases may pass vertically from the combustion chamber 28 through the tubes 32 and then out through the filtering plugs 41 which are threaded into the plate 40. A cap 42, having a nipple 43 at the center thereof, engages about the pipe 15 and is disposed in spaced relation to the top plate 40 and has a dependent outer edge portion 44 which loosely engages about the outer or peripheral edge of the plate 40 so that the gases, after passing through the filtering members 41, may pass into the atmosphere.

A cold water reservoir 45 is disposed above the heating chamber and about the pipe 15 and the cold water chamber 18 of the pipe 15 has an opening 46 adjacent the upper end of the reservoir 45 providing communication between the chamber 18 and the reservoir 45, and the chamber 18 also has a second lower opening 47 providing a second means of communication between the reservoir 45 and the chamber 18. A partition or wall 48 is secured across the chamber 18 adjacent the lower edge of the opening 46 so that when the valve 11 is opened, the water will first flow upwardly through the chamber 18 and then out through the opening 47 into the reservoir 45. The unheated water will then pass through the opening 46 into the upper part of the chamber 18 and then out through the valve or faucet 11.

In Figure 2, there is disclosed a pipe or hose 15a, in which a partition 16a is mounted and this partition 16a has opposed flanges 49 on opposite edges thereof which snugly engage the inside wall of the pipe or hose 15a. This partition 16a is normally in substantially I-form in transverse section and is constructed of yieldable material such as rubber or the like, and is provided with a stiffening or reinforcing member 50 which is vulcanized on the inside thereof so as to prevent collapsing of the transverse wall of the partition. This partition 16a may be used in a metal or rigid pipe or may be used in a flexible hose so that the water within the pipe or hose 15a will be prevented from freezing when the outer end thereof has been closed as by a valve or nozzle.

Figure 3 shows another pipe 15b in which a partition 16b is mounted and this partition 16b has oppositely extending flanges 51 on the opposite edges thereof which may be secured to the inside wall of the pipe 15b in any suitable manner.

A pipe 15c is shown in Figure 4, which has another form of partition 16c disposed therein which is provided with flanges 52 on the opposite edges thereof, these flanges 52 extending outwardly from the same side of the partition 16c. These flanges 52 may be welded or otherwise secured within the pipe 15c.

In Figure 5, there is shown a further form of dual pipe 15d having a partition 16d therein. This partition 16d has flanges 53 on opposite edges thereof which, in the present instance, extend outwardly from the same side of the wall 16d and, in this instance, the partition 16d is maintained in desired position within the pipe 15d by means of gaskets 54 which are interposed between the flanges 53 and the inside surface of the pipe 15d.

In the use and operation of this device, the burners 29 may be lighted to the desired degree so as to provide heat in the combustion chamber 28 which will rise upwardly through the heater tubes 32. The water in the chamber 31 will be heated and assuming that the valve or faucet 11 is closed, the pressure on the opposite sides of the partition 16 will be equal so that water will enter the chamber 31 through the intake opening 35 and as this water is heated, the heated water will flow out through the outlet opening 36. When the pressure in the hot water chamber 17 of the pipe 15 is equal to the pressure in the chamber 18, the valve 37 will be opened by gravity so that the hot water may flow upwardly through the chamber 17 and then pass about the end of the partition 23 in the valve nipple 22 and return through the chamber 18. The returning water will enter the reservoir 45 through the opening 46 and then pass out through the lower opening 47 in this reservoir back into the chamber 18. This water will then flow downwardly in the chamber 18 until the end 19 of the partition is reached, whereupon the water will return through the hot water chamber 17 and the intake opening 35 into the heating chamber 31.

When the faucet 11 is opened, the pressure of the water in the pipe 15 will effect closing of the check valve 37 so that only cold water will flow through the chamber 17 and at this time the cold water from the supply pipe 10 will flow upwardly through the chamber 18 and then enter the cold water reservoir 45 through the opening 47. This cold water from the chamber 18 will commingle with the cold water in the reservoir 45 and then flow out through the opening 46 and into the faucet 11 where this cold water will commingle with the water passing through the chamber 17.

It will be obvious from the foregoing that an automatic means has been provided whereby water in a pipe system will be prevented from freezing and that this anti-freezing means will operate automatically whenever the faucets or valves connected to the system are in closed position.

The reservoir 45 may be of any desired size and is here shown only diagrammatically, it being understod that this reservoir may be constructed in the form of a relatively large tank to hold the desired quantity of cold water which may be mixed with the water passing through the chamber 17 when the valve 11 is opened.

I claim:—

1. In a water system, a service pipe adapted to be connected at one end to a source of water supply, a valve at the other end of the pipe, a wall extending longitudinally of the pipe and dividing the pipe into two chambers, a heating member about the pipe, said pipe having spaced apart openings communicating with the heating member and with one of said chambers, and a check valve in one of said openings.

2. An anti-freezing means for a water system comprising a pipe interposed in the system, a partition dividing the pipe into two longitudinal chambers, a heating means about a portion of the pipe, said pipe having a pair of openings communicating with the heating means and one of the chambers, and an automatic valve carried by the pipe in one of said openings adapted to be closed by flow of water through the pipe when a faucet is opened and to be automatically opened when the faucet is closed.

3. An anti-freezing means for a water system comprising a pipe interposed in the system, a partition dividing the pipe into two longitudinal chambers open at each end, a heating means about the pipe adjacent one end thereof, said heating means including a reservoir, said pipe having a pair of openings therethrough communicating with the heating means and one of the chambers, and a gravity opening check valve carried by the pipe in one of the openings and operable to close said one opening when a faucet connected to the water system is opened.

4. An anti-freezing means for a water system comprising a pipe interposed in the system, a longitudinally extending partition in the pipe and dividing the pipe into two longitudinal chambers open at each end, a heating member secured to the pipe adjacent one end thereof, said pipe having a pair of openings communicating with the heating member and one of the chambers, a check valve carried by the pipe in one of the openings and a reservoir connected to the pipe, said pipe having a pair of openings in the other chamber establishing communication between the reservoir and said other chamber.

5. An anti-freezing means for a water system comprising a tubular member interposed in the system, a partition dividing the member into two longitudinal chambers open at each end, a heating member connected to the pipe, said pipe having openings in one chamber thereof establishing communication between said one chamber and the heating member, a gravity opening check valve carried by the pipe in one of said openings and a cold water reservoir connected to the pipe, said pipe having a pair of openings establishing communication between said reservoir and the other chamber.

ARIUS ATKINSON.